United States Patent
Dong et al.

(10) Patent No.: US 8,502,584 B1
(45) Date of Patent: Aug. 6, 2013

(54) CAPACITIVE ISOLATION RECEIVER CIRCUITRY

(75) Inventors: Zhiwei Dong, Austin, TX (US); Jing Li, Austin, TX (US); Michael L. Duffy, Austin, TX (US); Michael Mills, Austin, TX (US)

(73) Assignee: Silicon Laboratories Inc, Austin, TX (US)

( * ) Notice: Subject to any disclaimer, the term of this patent is extended or adjusted under 35 U.S.C. 154(b) by 0 days.

(21) Appl. No.: 13/436,146

(22) Filed: Mar. 30, 2012

(51) Int. Cl.
*H04B 1/38* (2006.01)
*H04B 1/18* (2006.01)

(52) U.S. Cl.
USPC ........... 327/206; 327/205; 375/219; 375/220; 307/109

(58) Field of Classification Search
USPC ......... 327/205–206; 375/219–222, 257–260; 326/21, 82
See application file for complete search history.

(56) References Cited

U.S. PATENT DOCUMENTS

| | | | |
|---|---|---|---|
| 5,495,186 A * | 2/1996 | Kanazawa et al. | 326/83 |
| 6,344,809 B1 * | 2/2002 | Kanekawa et al. | 341/101 |
| 7,737,871 B2 | 6/2010 | Leung | |
| 7,804,859 B2 | 9/2010 | Landry | |
| 7,902,627 B2 * | 3/2011 | Dong et al. | 257/499 |
| 8,169,108 B2 | 5/2012 | Dupuis | |
| 8,198,951 B2 * | 6/2012 | Dong et al. | 333/12 |
| 2003/0145121 A1 * | 7/2003 | Watkins | 709/250 |
| 2006/0250155 A1 * | 11/2006 | Chen et al. | 326/21 |
| 2008/0315925 A1 | 12/2008 | Alfano | |
| 2009/0017773 A1 | 1/2009 | Dupuis | |
| 2009/0027243 A1 | 1/2009 | Leung | |
| 2009/0213914 A1 | 8/2009 | Dong et al. | |
| 2010/0150338 A1 | 6/2010 | Nguyen | |
| 2010/0327930 A1 | 12/2010 | Yan et al. | |
| 2011/0050198 A1 | 3/2011 | Dong | |
| 2012/0161841 A1 * | 6/2012 | Dong et al. | 327/206 |

OTHER PUBLICATIONS

Chris Coughlin, Analog Devices, "Common Mode Transcient Immunity," Feb. 5, 2012, 3 pages.
U.S. Patent and Trademark Office, Office Action mailed Jan. 4, 2013, with Reply filed Mar. 26, 2013 in U.S. Appl. No. 13/435,179.
U.S. Appl. No. 13/435,179, filed Mar. 20, 2012, entitled "Providing Voltage Isolation on a Single Semiconductor Die" by Zhiwei Dong.

* cited by examiner

*Primary Examiner* — Vibol Tan
(74) *Attorney, Agent, or Firm* — Top, Pruner & Hu, P.C.

(57) ABSTRACT

One aspect of the present invention is directed to a circuit that includes an amplifier circuit disposed between an isolation link and a Schmitt trigger circuit to amplify a differential signal communicated over the isolation link and supply the amplified signal to the Schmitt trigger circuit. In turn, the Schmitt trigger circuit is coupled to the amplifier circuit to receive the differential signal and to supply a differential output signal corresponding to the differential signal communicated over the isolation link.

18 Claims, 5 Drawing Sheets

CAPACITIVE ISOLATION RECEIVER CIRCUITRY

BACKGROUND

In many different systems, an isolation barrier can be provided to enable communication of signals across a given type of the isolation. Existing solutions for providing isolation links include the use of magnetic pulse couplers, magnetic resistive couplers, capacitive couplers and optical couplers. Other isolation functions include control of high voltage circuitry.

Oftentimes isolation circuitry is used to communicate data and/or clock signals across the barrier to represent digital or analog values. Some systems implement an on-off keying (OOK) modulation scheme, where a modulated signal is transmitted. Sometimes communicating signals can be transmitted directly across the barrier. For example, with a capacitive isolation barrier, digital signals themselves can be transmitted across the barrier and transformed into pulses at a receiver input. However, attenuation due to the barrier makes it difficult to detect the received pulses correctly, especially in the presence of interference caused by common mode interference such as common mode transients.

SUMMARY OF THE INVENTION

According to one aspect, the present invention includes circuit that includes an amplifier circuit disposed between an isolation link and a Schmitt trigger circuit to amplify a differential signal communicated over the isolation link and supply the amplified signal to the Schmitt trigger circuit. In turn, the Schmitt trigger circuit is coupled to the amplifier circuit to receive the differential signal and to supply a differential output signal corresponding to the differential signal communicated over the isolation link.

In some embodiments, other possible circuit components may include a high pass filter to remove offset introduced by an amplifier and the isolation link, a voltage follower coupled to the Schmitt trigger circuit to receive the differential output signal and to output a voltage signal corresponding to the differential output signal, and a comparator coupled to the voltage follower to receive the voltage signal and to generate a logic output signal.

Another aspect of the present invention is directed to an isolation apparatus that provides for isolation of signals communicated between multiple semiconductor dies. To this end, a first semiconductor die can include an inverting signal path and a non-inverting signal path coupled to receive a single-ended signal and to generate a differential signal from the single-ended signal for transmission over a capacitive isolation barrier. A second semiconductor die may be coupled to the first semiconductor die via the capacitive isolation barrier and include receiver circuitry to receive and process the differential signal.

This receiver circuitry may include, in one embodiment, a low noise amplifier (LNA) to receive and amplify the differential signal to output an amplified differential signal. Further included may be a differential detection circuit coupled to receive the amplified differential signal and to supply at least one output signal. As one example, the detection circuit may be a Schmitt trigger stage coupled to the LNA to receive the differential signal and to supply the output signal, a voltage follower to receive the output signal and to output a voltage signal, and a comparator to receive the voltage signal and to generate a logic output signal from it.

A still further aspect of the present invention is directed to a method that includes receiving a differential signal in a receiver circuit via a capacitive isolation link, amplifying the signal in an amplifier to obtain an amplified differential signal, supplying a differential output signal from a Schmitt trigger circuit that receives the amplified differential signal, receiving the differential output signal in a voltage follower and outputting a voltage signal, and receiving the voltage signal in a comparator coupled to the voltage follower and generating a logic output signal from the voltage signal.

DETAILED DESCRIPTION

In various embodiments, isolation receiver circuitry can be implemented using a detection circuit to enable detection of digital signals communicated across the barrier with improved tolerance to noise and other interference. The detection circuit can be designed to be fast and sensitive in order to enable rapid detection of the input signals. Furthermore, a relatively constant gain of the detection circuit across a wide band of frequencies can be realized, improving performance.

Figure 1:
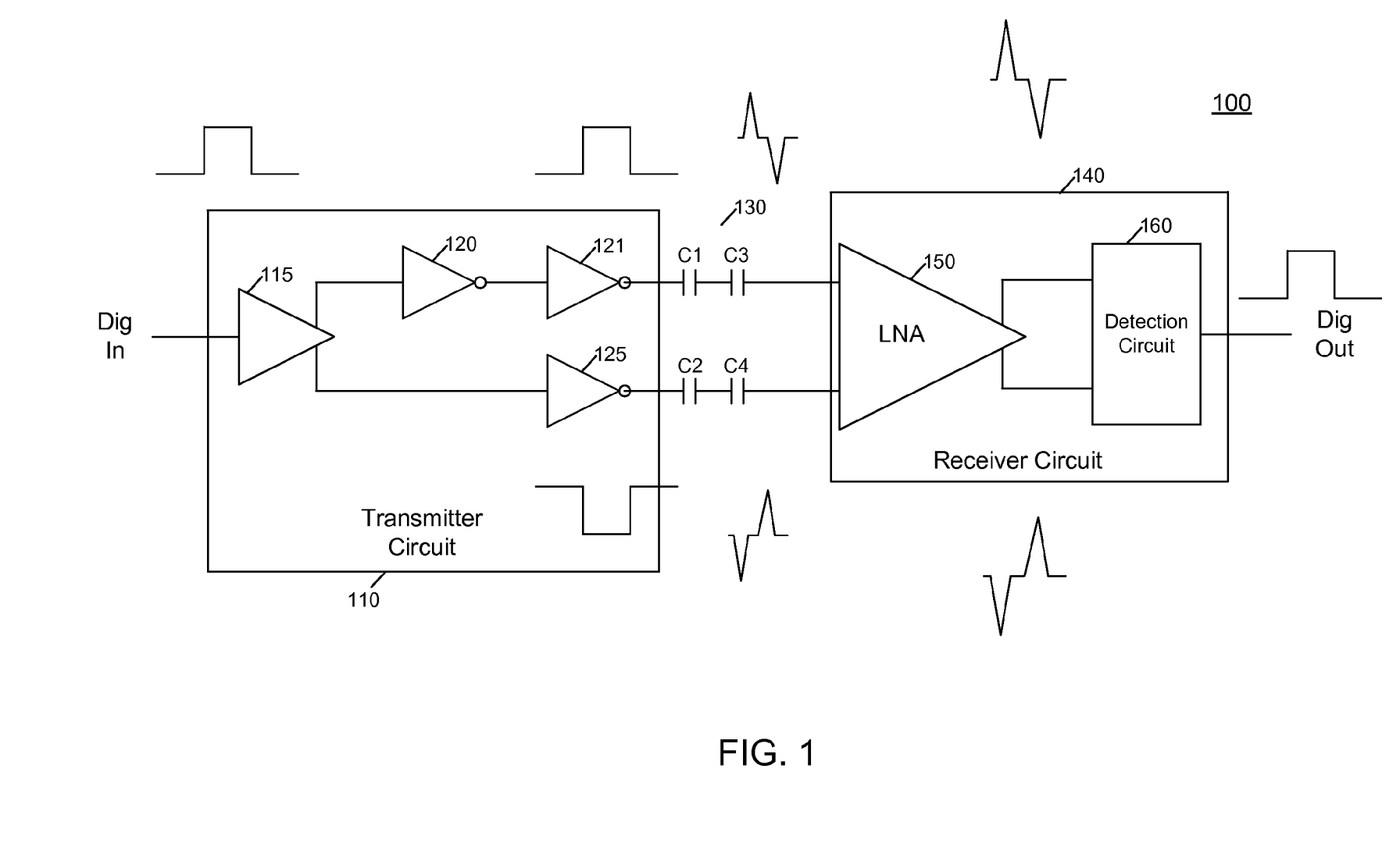
FIG. 1 is a high level schematic diagram of isolation circuitry in accordance with an embodiment of the present invention.

Referring now to FIG. 1, shown is a high level schematic diagram of isolation circuitry in accordance with an embodiment of the present invention. As shown in FIG. 1, circuit 100 can be an isolation circuit that may be implemented on one or more semiconductor die. In various embodiments, multiple die can be present and located within a single integrated circuit (IC) package as a multi-chip module (MCM), or the individual die can each be implemented in separate IC packages. Of course other embodiments are possible.

As seen in FIG. 1, isolation circuit 100 generally includes a transmitter circuit 110, which can be implemented on a first die, and a receiver circuit 140, which can be implemented on a second die. As seen, a capacitive isolation barrier 130 is configured between the two circuits and can be realized by capacitors C1 and C2, e.g., which may be present on the first die, and capacitors C3 and C4, which may be present on the second die. The capacitors may be, e.g., vertical, horizontal or finger capacitors. The isolation material may be silicon oxide or other isolation material. The isolation capacitors may range in an exemplary embodiment, e.g., from 18-35 femto-Farads. Persons of skill in the art recognize that other embodiments may utilize bigger or smaller capacitors.

The data is transmitted across the isolation barrier by driving a differential signal across the isolation capacitors C1 and C2 such that energy is coupled across the capacitors. This allows energy to be transmitted across the two dies. A first plate of capacitors C1 and C2 are associated with the input signal, and energy associated therewith is coupled across the high voltage isolation barrier created by the capacitors. Transmitter circuit 110 and receiver circuit 140 may be fabricated on a semiconductor die of one or more integrated circuits utilizing conventional processing techniques and available conductive layers. Note that there will be a loss associated with the coupling coefficient across the capacitor such that the amount of energy that can be delivered from the transmit side to the receive side is reduced. In one exemplary embodiment, isolation capacitors are utilized on only one side of the isolation link and the loss through the isolation link is small enough to significantly reduce the amplification gain or even avoid using a receive amplifier. The capacitive isolation link thus may be implemented by integrating a portion of the link in two galvanically isolated semiconductor die between which a high rate data link with voltage isolation is desired. While FIG. 1 shows that the first die includes only transmitter circuitry and the second die includes receiver circuitry, understand that both die may include both transmit and receive circuitry. In other embodiments, one of the die may include only transmitter or receiver circuitry with the partnered die including a corresponding receiver or transmitter. In one exemplary embodiment, RF signals are generated within the transmit circuitry on one side of the capacitive isolation link, and the RF signals are transmitted between the dies utilizing the connection through the capacitors in each die and the capacitive coupling therebetween.

Once the RF signals are received at the receiving side, receiver circuit 140 detects the data contained within the transmission from the first die and utilizes the data as appropriate. While the description with respect to FIG. 1 illustrates a limited amount of circuitry within each die, additional circuitry may be implemented on the die for performing processing functions associated with the data transmitted over the capacitive isolation link. The data transmitted over the capacitive isolation link may be transmitted using either frequency modulation techniques or amplitude modulation techniques as examples.

Still referring to FIG. 1, an incoming digital signal thus can be provided to transmitter circuit 110. Transmitter circuit 110 can include a buffer 115 that buffers the incoming digital signal and provides it to differential paths, namely a positive-going or non-inverting path including a pair of inverters 120 and 121 and a negative-going or inverting path including an inverter 125. Thus for an incoming logic high digital pulse into transmitter circuit 110, the positive-going path outputs a corresponding positive or logic high digital pulse while the negative-going path outputs a negative or logic low digital pulse.

As further seen, after being passed through capacitive isolator 130 each pulse at the transmitter output is now transformed into two pulses of much narrower width and amplitude, owing to losses inherent in the isolation circuitry. As an example, the pulses output from transmit circuitry 110 may be differential signals having a differential swing of approximately 2-3 volts. However, when received in receiver circuitry 140, the corresponding pulses may be of much smaller amplitude, e.g., having a differential swing of approximately 20 millivolts.

Accordingly, receiver circuitry 140 includes amplification circuitry. More specifically as seen, receiver circuitry 140 includes a low noise amplifier (LNA) 150 which may receive the incoming differential signals and amplify them. The amplified digital signals may be provided to a detection circuit 160 in accordance with an embodiment of the present invention, which can detect the incoming pulses to thus re-create the original digital signal. This re-created signal can be provided to other circuitry, e.g., of the same die or another location. In various embodiments, detection circuit 160 can detect transitions at very high speeds (e.g., within 250 picoseconds). To realize this, the detection circuit can be designed with weak feedback together with small capacitance associated with it to ensure weak signals can be detected. This high speed detection circuitry may also be less dependent on supply voltage to avoid false alarm or missing detection.

Note that in some embodiments, LNA 150 may be optional. The output of the amplifier, if present, is supplied to detection circuit 160, which may include a differential Schmitt trigger. When the input value is higher than a first threshold, the output of the Schmitt trigger goes to a logical high level. Similarly, when the input is below a second lower threshold level, the output goes to a logical low level. When the input remains between the high and low threshold levels, the output retains its current value. A Schmitt trigger thus provides greater stability than a circuit input including a single input threshold level. Although shown at this high level in the embodiment of FIG. 1, understand the scope of the present invention is not limited in this regard.

Figure 2:
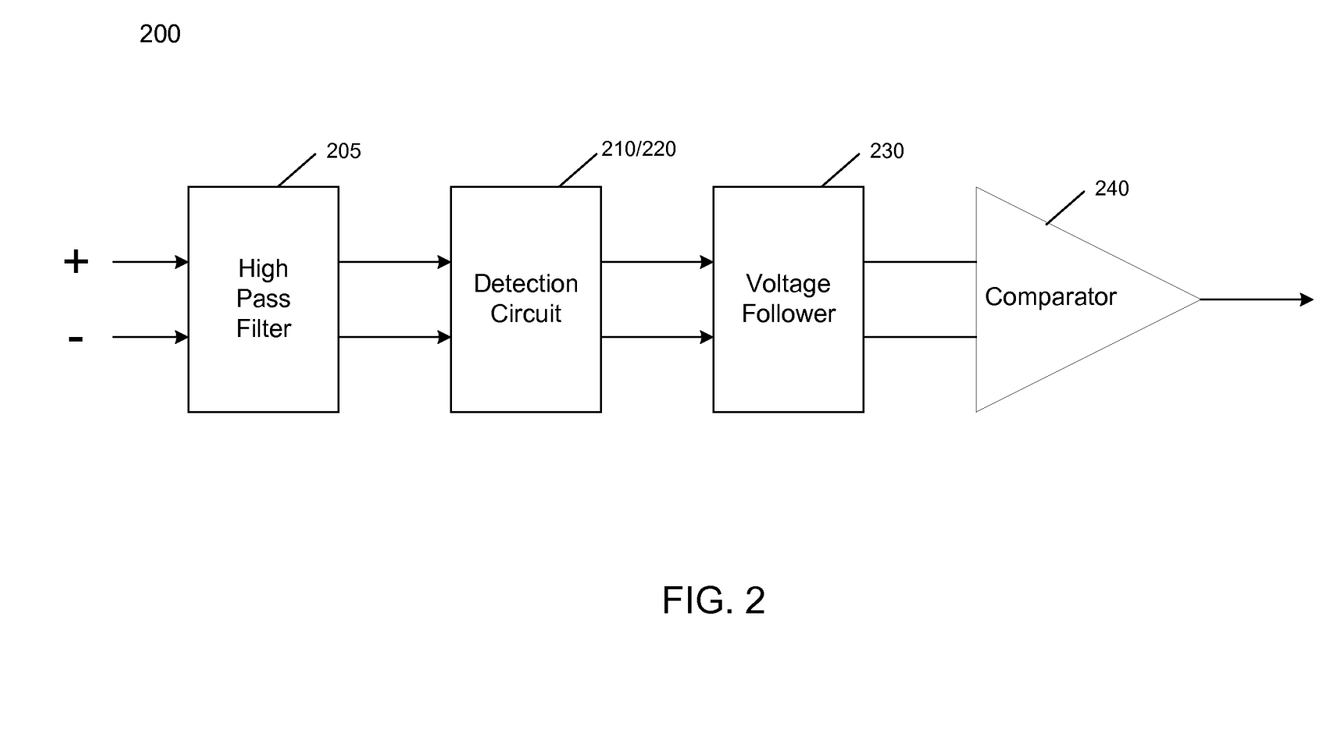
FIG. 2 is a block diagram of a high level view of a detection circuit in accordance with an embodiment of the present invention.

Referring now to FIG. 2, shown is a block diagram of a high level view of a detection circuit in accordance with an embodiment of the present invention. As shown in FIG. 2, detection circuit 200 can be configured to receive an incoming differential signal, e.g., received from an output of an LNA or other amplifier. As seen, an optional high pass filter (HPF) 205 can filter the incoming signal then this incoming signal can be provided to a detection circuit 220, which conditions the input signal and performs detections with hysteresis in accordance with an exemplary embodiment. The resulting detected signals may be provided to a voltage follower 230 and on to a comparator 240, which can generate a single-ended output from a differential input. In this way, the resulting output can be a digital signal corresponding to the original digital signal that was input to the transmit circuitry (not shown for ease of illustration in FIG. 2).

Figure 3:
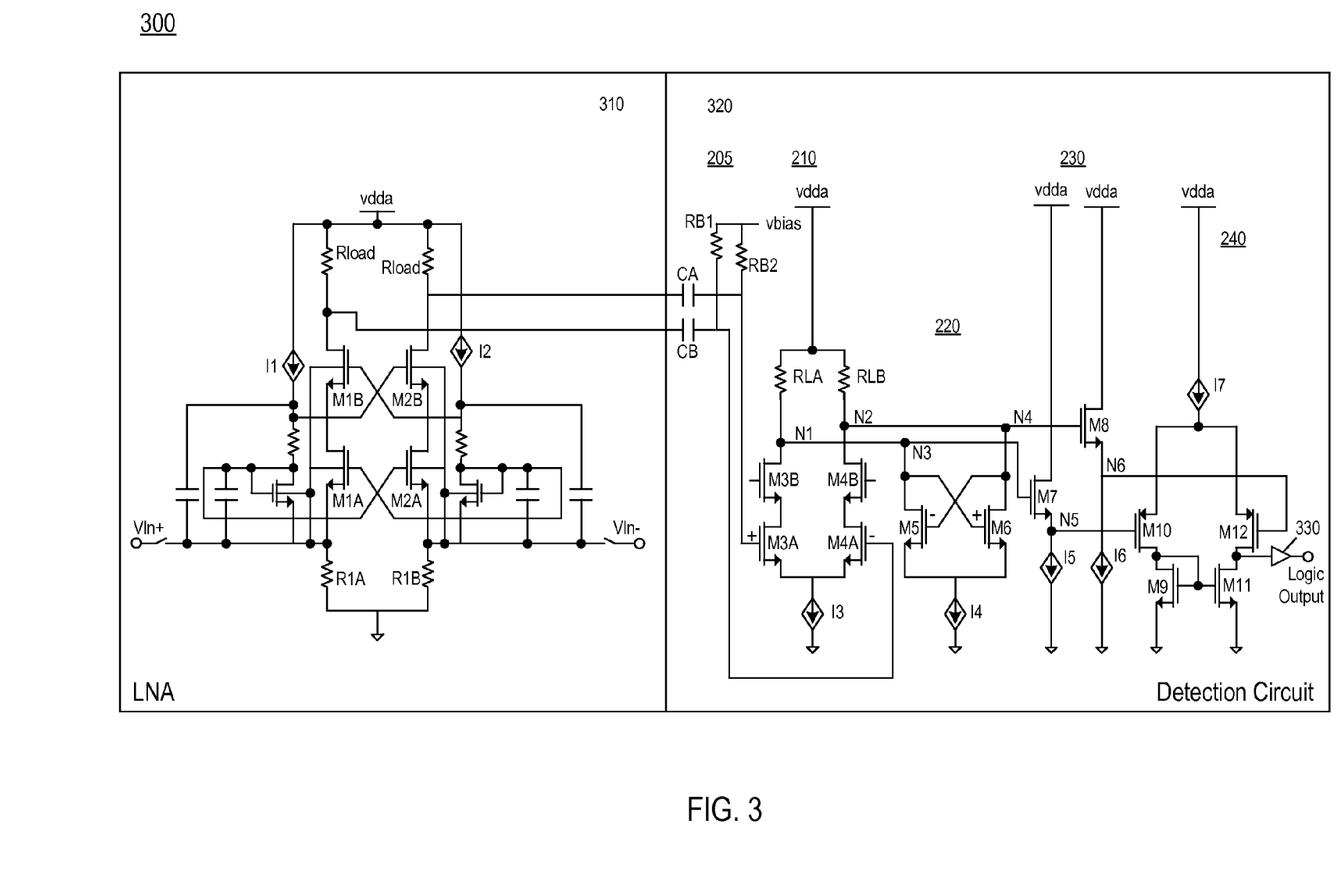
FIG. 3 is a schematic diagram of a receiver circuit in accordance with an embodiment of the present invention.

Referring now to FIG. 3, shown is a schematic diagram of a receiver circuit in accordance with an embodiment of the present invention. As shown in FIG. 3, receiver circuit 300 includes an LNA 310 and a high-speed detection circuit 320. In general, LNA 310 is configured to receive an incoming differential signal, e.g., received from a capacitive isolation barrier, and amplify the differential signal while suppressing common mode transient current. In general, LNA 310 is configured to receive these incoming differential signals at input nodes Vin+ and Vin−. In turn, the differential input signal is provided to a pair of cascoded-coupled-amplifier structures including differential pairs of NMOS transistors M1A/M1B and M2A/M2B. As seen, the outputs of the cascoded transistors M2A and M2B provide amplified output signals which are coupled via capacitors CA and CB to detection circuit 320.

In general, detection circuit 320 may include the various stages described above with regard to FIG. 2. Namely, these stages include a high pass filter 205, Schmitt trigger input stage 210, Schmitt trigger feedback stage 220, a voltage follower 230, and a comparator 240. As seen, the incoming differential signal is provided to a Schmitt trigger input stage 210, which is biased by a pair of bias resistors RB1/RB2 coupled to a bias voltage source Vbias. The differential signals are provided to a differential amplifier stage formed of pairs of cascoded transistors M3A/M3B and M4A/M4B. As seen, the outputs of cascoded transistors M3B and M4B are connected to nodes N1 and N2. Schmitt trigger feedback stage 220 includes a cross-coupled pair of NMOS transistors M5 and M6 are coupled between the input stage output nodes N1 and N2 and a current source I4. Transistors M5 and M6 have their respective drain/source paths coupled between loads RLA and RLB at the output nodes N1 and N2 and current source I4. Hysteresis for the positive and negative-going pulses is provided by transistors M6 and M5 so that voltage values beyond the thresholds set by these transistors occur in order to change the output. In an exemplary embodiment, the desired hysteresis is 150 mV for the positive threshold and −150 mV for the negative threshold. In some embodiments, high pass filter 205 and Schmitt trigger input stage 210 are optional, and the signal provided by the LNA is large enough and the voltage headroom is also sufficient.

This Schmitt trigger circuit 210/220 translates incoming pulses, which have been amplified by LNA 310 into differential low-swing digital signals which are provided via trigger stage input/output nodes N3 and N4 (at the same electrical nodes as output nodes N1 and N2, respectively) to gate terminals of NMOS transistors M7 and M8 of voltage follower circuitry 230. As seen, each of these transistors is coupled between a supply voltage and a corresponding current source I5 and I6.

In one exemplary embodiment, Schmitt trigger circuit 210/220 provides a differential output signal corresponding to the differential signal communicated over the isolation link. While the output is shown as differential, other embodiments may utilize a single-ended output. The use of the Schmitt trigger to detect the signal transmitted on the isolation link allows the gain of the amplifier to be lower, reduces the power and complexity of the receiver, improves jitter performance and channel-to-channel match for the isolation link.

The source terminals of transistors M7 and M8 of voltage follower stage 230 provide a voltage output at voltage follower output nodes N5 and N6 that in turn are coupled to an input of a comparator 240. More specifically as seen, the differential output from voltage follower 230 may be provided to the gate terminals of PMOS transistors M10 and M12 of comparator 240. As seen, the drain terminals of transistors M11 and M12 may be coupled to a logic circuit used to generate a logic output, namely via an inverter 330 that is coupled between drain terminals of transistor M12 and an output transistor M11 of a current minor formed of NMOS transistors M9 and M11. Although shown with this particular embodiment in the embodiment of FIG. 3, understand the scope of the present invention is not limited in this regard.

Figure 4:
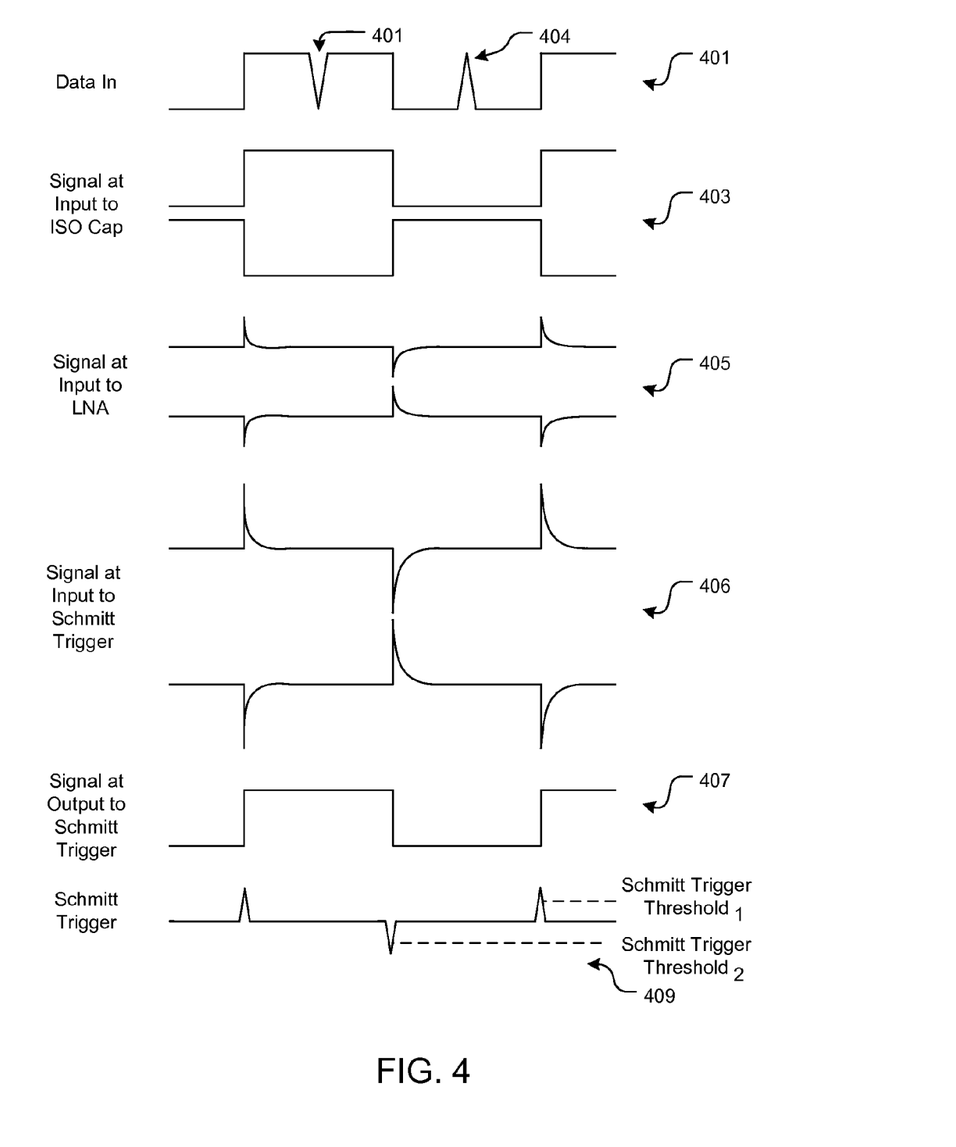
FIG. 4 is a timing diagram to illustrate operation of an isolation circuit in accordance with one exemplary embodiment of the present invention.

Referring to FIG. 4, the timing diagrams illustrate operation of the isolation circuit shown in FIG. 1. The data received shown in waveform 401 is serially transmitted from transmit circuitry to the receive circuitry. More specifically, the signal after the creation of a differential signal in the transmit circuit at the input to isolation circuitry is shown at 403. The data is transmitted across the isolation barrier by driving a differential signal across the isolation capacitors such that energy is coupled across the capacitors. This allows energy to be transmitted across the two semiconductor die. The falling (rising) edge of the positive (negative) data shown in waveform 403 creates the negative and positive going pulses shown in waveform 405, which is received in a LNA of the second semiconductor die. The LNA amplifies the signal as shown in waveform 406 to address the losses associated with transmission across the isolation barrier. The detection circuit is coupled to receive the LNA differential output and provide the output signal shown at 407, which corresponds to the received data. As shown in waveform 409, detection circuit 320 (e.g., of FIG. 3) has two thresholds to determine the rising edge and the falling edge of the pulse as shown.

Figure 5A:
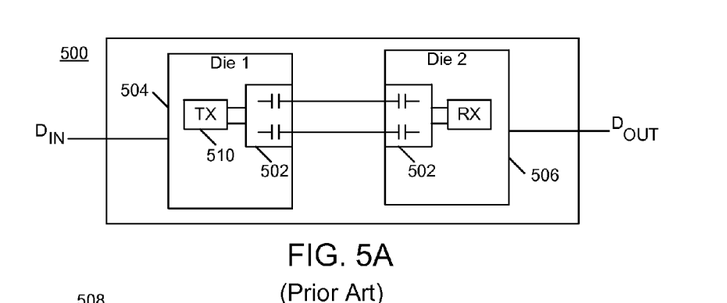
FIG. 5A illustrates an integrated capacitive isolation link in a single package including two semiconductor dies in accordance with an embodiment of the present invention.

Referring now to FIG. 5A, there is illustrated the manner in which a capacitive isolation link represented as capacitive isolation circuitry 502 may be integrated into two separate multi-functional dies, 504 and 506, within a single package 500. The capacitive isolation circuitry 502 may provide isolation between components on two separate dies 504 and 506. Associated with one or both of the dies could be additional circuitry 510 such as a microcontroller or other electronic component. This additional circuitry would be isolated from components in the other die via the capacitive isolation link 502.

Figure 5B:
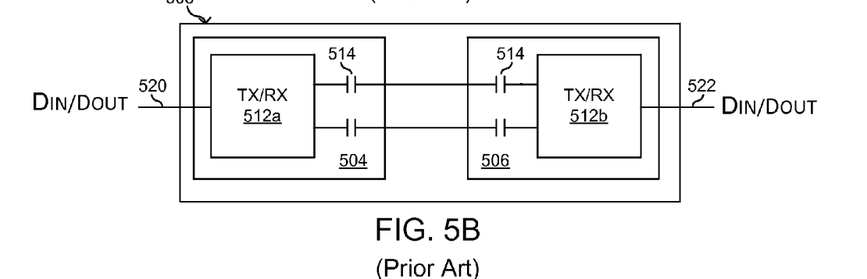
FIG. 5B illustrates an integrated capacitive isolation link in a single package having a digital input and a digital output in accordance with an embodiment of the present invention.

Referring now also to FIG. 5B, when a capacitive isolation link is integrated onto two separate dies 504 and 506 in a single package 500, the isolation interface 502, which includes transceivers 512 and capacitors 514 (generally), may be used to provide simply a digital IN, digital OUT package 500. In this embodiment, the digital input 520 is applied to a first transceiver 512a. Alternatively, the digital input 520 could be applied to digital circuitry connected to transceiver 512a. The isolation circuit operates in the manner described herein above and a second digital output 522 is provided from transceiver 512b or associated digital circuitry.

Figure 5C:
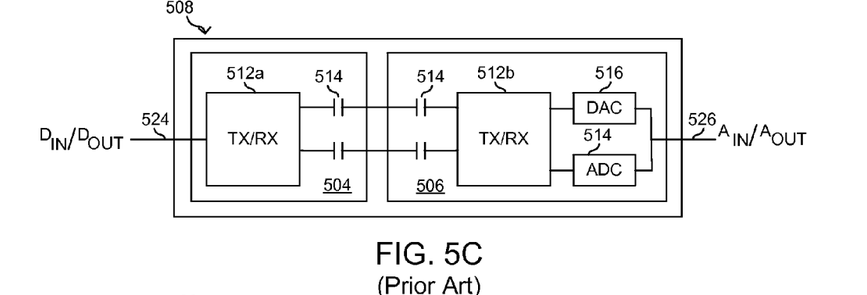
FIG. 5C illustrates an integrated capacitive isolation link in a single package including a digital input/output and an analog input/output in accordance with an embodiment of the present invention.

Referring now to FIG. 5C, rather than providing a digital input/digital output circuit, a single package 500 including first and second dies 504, 506 implementing the capacitive isolation circuit described above, may provide a circuit with a digital input/output and an analog input/output. In this case, a digital input/output 524 would connect with transceiver 512a or digital circuitry of a first die 504. The first die 504 is coupled with the second die 506 via the described capacitive isolation link, and transceiver 512b is coupled to an analog input/analog output 526 through a data converter, either an ADC 514 or a DAC 516, depending upon the direction of signal flow.

Figure 5D:
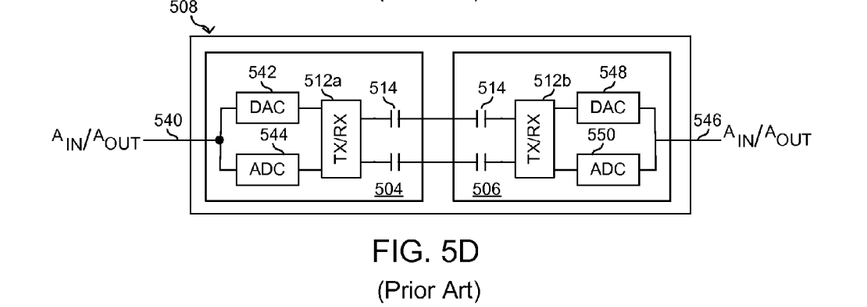
FIG. 5D illustrates an integrated capacitive isolation link in a single package including an analog input/output and an analog input/output in accordance with an embodiment of the present invention.

Referring now to FIG. 5D, a single package 500, including first and second dies 504, 506 implementing the RF isolation circuit described above, may provide a circuit with an analog input/output and on one side and an analog input/output on the other side. In this case, an analog input/output 540 connects to an A-D converter 542 and a D-A converter 544 and then to the transceiver 512a or digital circuitry of a first die 504. The first die 504 is coupled with the second die 506 via the described RF isolation link, and the transceiver 512b is coupled to an analog input/output 546 via an A-D converter 548 and D-A converter 550. In this way, analog signals may be transmitted in either direction across the single package 500.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. An apparatus comprising:
an amplifier circuit coupled between an isolation link and a Schmitt trigger circuit to amplify a differential signal communicated over the isolation link and supply the amplified differential signal to the Schmitt trigger circuit;

a high pass filter to receive the differential signal communicated over the isolation link; and the Schmitt trigger circuit coupled to the amplifier circuit to receive the amplified differential signal and to supply a differential output signal corresponding to the differential signal communicated over the isolation link.

2. The apparatus of claim 1, further comprising a voltage follower coupled to the Schmitt trigger circuit to receive the differential output signal and to output a voltage signal corresponding to the differential output signal.

3. The apparatus of claim 2, further comprising a comparator coupled to the voltage follower to receive the voltage signal and to generate a logic output signal therefrom.

4. The apparatus of claim 3, wherein the Schmitt trigger circuit comprises:

a first cascode transistor pair to receive a first portion of the amplified differential signal at a gate terminal of a first transistor of the first cascode transistor pair, the first cascode transistor pair having drain-source paths coupled between a first output node and a first current source;

a second cascode transistor pair to receive a second portion of the amplified differential signal at a gate terminal of a first transistor of the second cascode transistor pair, the second cascode transistor pair having drain-source paths coupled between a second output node and the first current source;

a fifth transistor having a drain-source path coupled between the first output node and a second current source; and a sixth transistor having a drain-source path coupled between the second output node and the second current source.

5. The apparatus of claim 4, wherein the voltage follower comprises:

a seventh transistor having a gate terminal coupled to the first output node and a drain-source path coupled between a supply voltage and a third current source; and an eighth transistor having a gate terminal coupled to the second output node and a drain-source path coupled between the supply voltage and the third current source.

6. The apparatus of claim 5, wherein the comparator comprises a current source, differential input transistors, a current mirror load coupled to an output of the voltage follower, and an inverter to provide the logic output signal.

7. The apparatus of claim 1, further comprising first and second capacitors coupled between the amplifier circuit and the Schmitt trigger circuit and a pair of bias resistors coupled between a bias voltage node and the Schmitt trigger circuit.

8. The apparatus of claim 1, wherein the Schmitt trigger circuit comprises a Schmitt trigger feedback stage.

9. An isolation apparatus comprising:

a first semiconductor die comprising:

an inverting signal path and a non-inverting signal path coupled to receive a single-ended signal and to generate a differential signal from the single-ended signal for transmission over a capacitive isolation barrier; and a second semiconductor die coupled to the first semiconductor die via the capacitive isolation barrier, the second semiconductor die comprising:

a low noise amplifier (LNA) coupled to receive the differential signal communicated over the capacitive isolation barrier and to amplify the differential signal to output an amplified differential signal; and a differential detection circuit coupled to receive the amplified differential signal and to supply at least one output signal corresponding thereto, wherein the capacitive isolation barrier is to electrically isolate the first and second semiconductor dies and includes a first isolation capacitor on the first semiconductor die and a second isolation capacitor on the second semiconductor die to provide a first portion of the differential signal to the differential detection circuit, wherein the differential detection circuit comprises a Schmitt trigger stage coupled to the LNA to receive the amplified differential signal and to supply the at least one output signal, a voltage follower coupled to the Schmitt trigger stage to receive the at least one output signal and to output a voltage signal corresponding to the at least one output signal, and a comparator coupled to the voltage follower to receive the voltage signal and to generate a logic output signal therefrom.

10. The isolation apparatus of claim 9, wherein the Schmitt trigger stage comprises a first cascode transistor pair to receive a first portion of the amplified differential signal at a gate terminal of a first transistor of the first cascode transistor pair, the first cascode transistor pair having drain-source paths coupled between a first output node and a first current source, and a second cascode transistor pair to receive a second portion of the amplified differential signal at a gate terminal of a first transistor of the second cascode transistor pair, the second cascode transistor pair having drain-source paths coupled between a second output node and the first current source, a fifth transistor having a drain-source path coupled between the first output node and a second current source, and a sixth transistor having a drain-source path coupled between the second output node and the second current source.

11. The isolation apparatus of claim 10, wherein the voltage follower comprises a seventh transistor having a gate terminal coupled to the first output node and a drain-source path coupled between a supply voltage and a third current source, and an eighth transistor having a gate terminal coupled to the second output node and a drain-source path coupled between the supply voltage and the third current source.

12. The isolation apparatus of claim 11, wherein the comparator comprises a current mirror coupled to an output of the voltage follower and an inverter to provide the logic output signal.

13. The isolation apparatus of claim 9, wherein the differential signal comprises a modulated signal.

14. The isolation apparatus of claim 13, wherein the modulated signal comprises an on/off keyed signal.

15. A method comprising:

receiving a differential signal in a receiver circuit of a second semiconductor die from a first semiconductor die coupled to the second semiconductor die via a capacitive isolation link;

amplifying the differential signal in an amplifier of the second semiconductor die to obtain an amplified differential signal;

supplying a differential output signal from a Schmitt trigger circuit coupled to the amplifier that receives the amplified differential signal from the amplifier;

receiving the differential output signal in a voltage follower coupled to the Schmitt trigger circuit and generating a voltage signal corresponding to the differential output signal; and receiving the voltage signal in a comparator coupled to the voltage follower and generating a logic output signal from the voltage signal.

16. The method of claim 15, further comprising:

receiving a first portion of the amplified differential signal at a gate terminal of a first transistor of a first cascode transistor pair having drain-source paths coupled between a first output node and a first current source;

receiving a second portion of the amplified differential signal at a gate terminal of a first transistor of a second cascode transistor pair having drain-source paths coupled between a second output node and the first current source;

applying a first threshold to the first portion of the amplified differential signal via a fifth transistor having a drain-source path coupled between the first output node and a second current source; and applying a second threshold to the second portion of the amplified differential signal via a sixth transistor having a drain-source path coupled between the second output node and the second current source.

17. The method of claim 16, further comprising:

switching a state of the logic output signal in a first direction when the first portion of the differential output signal exceeds the first threshold; and switching a state of the logic output signal in a second direction when the second portion of the differential output signal exceeds the second threshold.

18. The method of claim 17, further comprising maintaining a current level of the logic output signal when the differential output signal is between the first and second thresholds.

\* \* \* \* \*